United States Patent
Watanabe et al.

(10) Patent No.: US 6,800,011 B2
(45) Date of Patent: Oct. 5, 2004

(54) ELECTRODE PRODUCING METHOD

(75) Inventors: Kenichi Watanabe, Kanagawa (JP);
Tsutomu Tobita, Kanagawa (JP);
Nobuyuki Iwazaki, Kanagawa (JP);
Masayoshi Muramatsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 59 days.

(21) Appl. No.: 10/188,361

(22) Filed: Jul. 3, 2002

(65) Prior Publication Data

US 2003/0087578 A1 May 8, 2003

(30) Foreign Application Priority Data

Jul. 4, 2001 (JP) .................................... 2001-203864

(51) Int. Cl.[7] ................ H01J 9/02; H05K 3/30
(52) U.S. Cl. ............ 445/35; 445/46; 445/50; 445/67; 445/69; 29/825; 29/837; 29/879; 140/71.6; 140/112; 228/212; 313/346 R
(58) Field of Search .................. 445/23, 29, 35, 445/45, 50, 51, 67, 69, 72; 29/825, 837–840, 874–879; 140/71 R, 71.5, 71.6, 111, 112; 228/126, 131, 212, 104; 219/56, 56.1, 56.22, 55, 145.32; 313/331–346 DC

(56) References Cited

U.S. PATENT DOCUMENTS

| 3,259,969 | A | * | 7/1966 | Tessmann | 228/125 |
| 3,521,107 | A | * | 7/1970 | Zemel et al. | 313/558 |
| 4,959,588 | A | * | 9/1990 | Vida et al. | 313/625 |
| 5,606,219 | A | * | 2/1997 | Tobita et al. | 313/632 |
| 5,880,425 | A | * | 3/1999 | Carnes et al. | 219/112 |
| 5,880,559 | A | * | 3/1999 | Fox et al. | 313/633 |
| 5,882,723 | A | * | 3/1999 | Tsou | 427/125 |
| 6,008,583 | A | * | 12/1999 | Breuer et al. | 313/594 |
| 6,201,349 | B1 | * | 3/2001 | Pfaffel | 313/631 |
| 6,268,697 | B1 | * | 7/2001 | Nishida et al. | 313/607 |
| 6,437,509 | B1 | * | 8/2002 | Eggers | 313/633 |

FOREIGN PATENT DOCUMENTS

JP     6-230456     8/1994

* cited by examiner

Primary Examiner—Ashok Patel
Assistant Examiner—German Colòn
(74) Attorney, Agent, or Firm—Sughrue Mion, PLLC

(57) ABSTRACT

A flash discharge tube includes a pin-shaped cathode. The pin-shaped cathode has an electrode core of tungsten having a first end portion. A lead of nickel has a second end portion connected with the first end portion. In the electrode producing method, the electrode core and the lead are retained by use of respectively first and second chuck mechanisms with the first and second end portions opposed to one another. The first and second end portions are pushed on one another by moving at least one of the first and second chuck mechanisms. While the first and second end portions are pushed on one another, the first and second chuck mechanisms are supplied with electric current, so as to weld the electrode core and the lead together therewith by resistance welding.

22 Claims, 14 Drawing Sheets

ELECTRODE PRODUCING METHOD

BACKGROUND OF THE INVENTION

1. Field of the Invention

The present invention relates to an electrode producing method. More particularly, the present invention relates to an electrode producing method in which metal bars for an electrode can be welded together efficiently.

2. Description Related to the Prior Art

A camera has an electronic flash device, which includes a flash discharge tube. The flash discharge tube has a glass vessel and xenon gas enclosed therein. Pin-shaped electrodes are positioned through end portions of the glass vessel. For flash emitting operation, a main capacitor is discharged, so that charge passes between the pin-shaped electrodes to emit flash light instantaneously.

Each of the pin-shaped electrodes includes an electrode core and a lead connected therewith. The electrode core is contained in the glass vessel, and formed from tungsten (W). The lead protrudes externally from the glass vessel, and is formed from nickel (Ni) or manganese-nickel (Mn—Ni). To obtain the pin-shaped electrode, an end of a tungsten bar is welded on to an end of a nickel lead. Specifically, an electric current is caused to flow between the tungsten bar and the nickel lead while the end of the tungsten bar is kept butting on that of the nickel lead. The end of the nickel lead is melted, and wraps the end of the tungsten bar for the welding, because the nickel lead has a considerably low melting point. A ball-shaped melted portion is formed at the end of the nickel lead being welded, and is used for positioning the pin-shaped electrode in the glass vessel.

A ring-shaped cathode part is attached to the tungsten bar of the pin-shaped electrode being a cathode, and formed from sintered metal including cesium compound, and operates for raising efficiency in emission of electron. The ring-shaped cathode part has a central hole, in which the pin-shaped electrode is inserted. The ring-shaped cathode part is depressed and deformed, and attached to the pin-shaped electrode by caulking. For the purpose of tightening the caulking, a surface of the tungsten bar of the pin-shaped electrode is provided with a random pattern of minute recesses or scratches.

The ball-shaped melted portion formed between the tungsten bar and the nickel lead is required to have a regularized shape and size for the purpose of positioning the pin-shaped electrode in the glass vessel. However, the shape of the ball-shaped melted portion changes according to various conditions of welding, and is difficult to have a regularized common shape.

In the conventional technique for the pin-shaped electrode, the random pattern of recesses or scratches is formed by cutting, scraping or abrading or in other manners at the time of manufacturing the tungsten bar. However, the number of steps of creating the random pattern is considerably great. So the cost for producing the pin-shaped electrode cannot be reduced because of the complicated processes.

SUMMARY OF THE INVENTION

In view of the foregoing problems, an object of the present invention is to provide an electrode producing method in which metal bars for an electrode can be welded together efficiently, to produce the electrode at a low cost.

In order to achieve the above and other objects and advantages of this invention, an electrode producing method of producing a pin-shaped electrode for a flash discharge tube is provided, the pin-shaped electrode including a first bar of metal having a first end portion, and a second bar of metal having a second end portion connected with the first end portion. In the electrode producing method, the first and second bars are retained by use of respectively first and second chuck mechanisms with the first and second end portions opposed to one another. The first and second end portions are pushed on one another by moving at least one of the first and second chuck mechanisms. While the first and second end portions are pushed on one another, the first and second chuck mechanisms are supplied with electric current, so as to weld the first and second bars together therewith by resistance welding.

In the welding step, the second end portion is melted to form a ball-shaped melted portion, the ball-shaped melted portion is secured by wrapping the first end portion.

The flash discharge tube includes a vessel having discharge gas enclosed therein. A second pin-shaped electrode is inserted through and secured to the vessel. The pin-shaped electrode is inserted through the vessel, the second bar extends externally from the vessel, the first bar is disposed in the vessel, and opposed to the second pin-shaped electrode. The ball-shaped melted portion is positioned on an outer surface of the vessel.

Furthermore, a protruding amount of the first bar from the first chuck mechanism is adjusted before the second chuck mechanism supplies the second bar.

The ball-shaped melted portion after welding has a greater diameter than a thickness thereof as viewed in an axial direction of the pin-shaped electrode.

The first and second chuck mechanisms include first and second two-way chucks, the first two-way chuck squeezes the first bar in a first squeezing direction, the second two-way chuck squeezes the second bar in a second squeezing direction, the first and second squeezing directions are substantially perpendicular to one another.

The first bar has a diameter Dw, and the protruding amount of the first bar from the first chuck mechanism is from 0.6·Dw to 1.5·Dw.

The first bar includes tungsten.

The pin-shaped electrode is a pin-shaped cathode, and further includes a ring-shaped cathode part secured to the first bar. Furthermore, a surface of the first bar is subjected to surface processing. The cathode part is secured to the first bar after the surface processing.

According to another aspect of the invention, an electrode producing method of producing a pin-shaped electrode for a flash discharge tube is provided, the pin-shaped electrode including a first bar of metal and a ring-shaped cathode part, secured to the first bar, for raising efficiency in emitting electron. In the electrode producing method, a recess is formed in the first bar by applying laser light thereto. The cathode part is secured to the recess.

Furthermore, gas is blown over the first bar during the recess forming step, to blow away metal dust created by forming the recess.

The first bar has a first end portion disposed on a farther side from the cathode part. The pin-shaped electrode further includes a second bar of metal having a second end portion connected with the first end portion. Furthermore, the second bar is connected with the first bar before the recess forming step.

The cathode part has a size Lc in an axial direction of the pin-shaped electrode, and the recess has a width from 0.1·Lc to 1.5·Lc in the axial direction.

The first bar has a diameter Dw, and the recess has a depth from 0.03·Dw to 0.4·Dw.

The cathode part includes cesium.

According to still another aspect of the invention, the first bar is provided with surface roughness by subjecting the first bar to sandblast processing. The cathode part is secured to the first bar after the sandblast processing.

Furthermore, the cathode part is pressurized and deformed, to attach the cathode part to the first bar.

The first bar has a first end portion disposed on a farther side from the cathode part. The pin-shaped electrode further includes a second bar of metal having a second end portion connected with the first end portion. Furthermore, a step of connecting the second bar with the first bar before the sandblast processing.

Consequently, the metal bars for an electrode can be welded together efficiently, to produce the electrode at a low cost.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
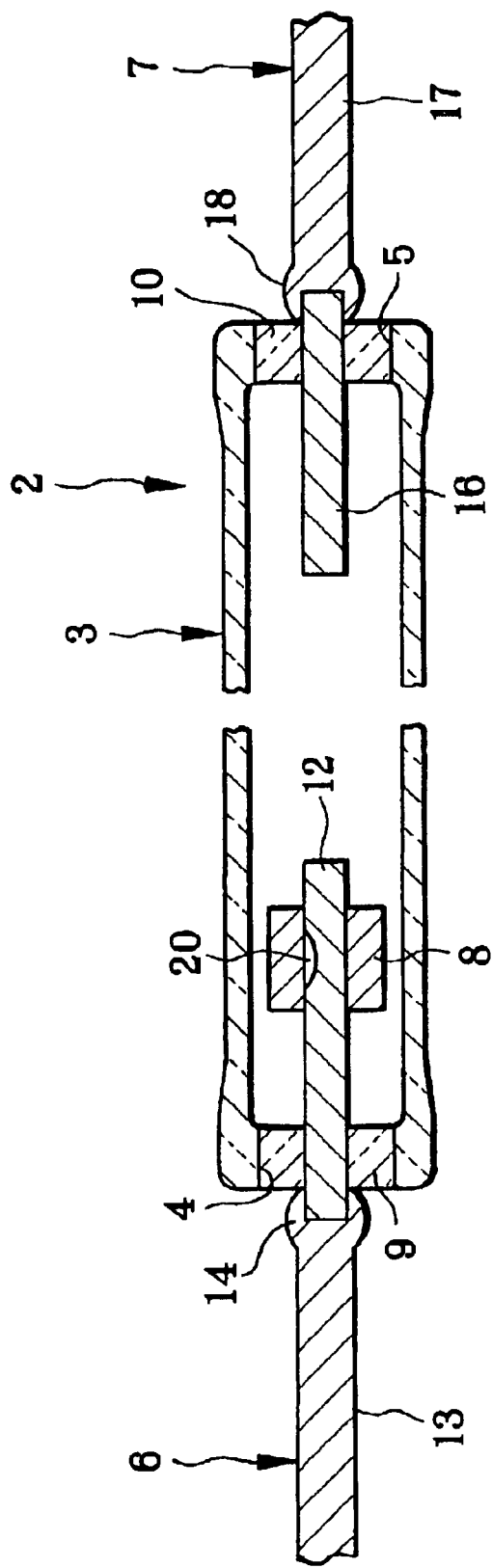
FIG. 1 is an explanatory view in vertical section, illustrating a flash discharge tube.
Figure 2:
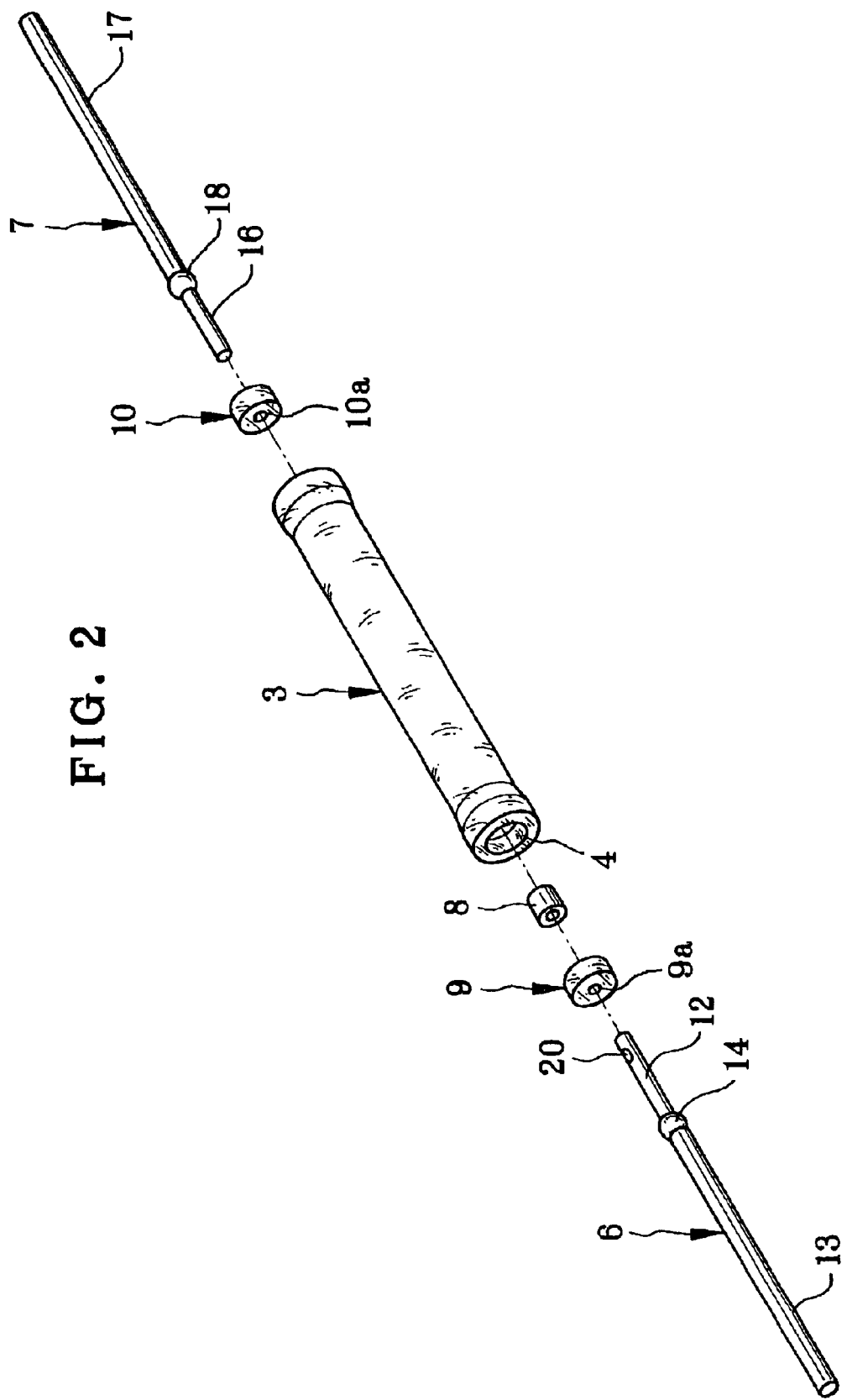
FIG. 2 is an exploded perspective illustrating the flash discharge tube.

In FIGS. 1 and 2, a flash discharge tube 2 produced according to the present invention is illustrated. The flash discharge tube 2 includes a vessel 3, and a pin-shaped cathode 6 and a pin-shaped anode 7 as two electrodes. The vessel 3 is formed in a tubular shape, is transparent, and is made of glass. Openings 4 and 5 are formed in ends of the vessel 3. The pin-shaped cathode and anode 6 and 7 are inserted in respectively the openings 4 and 5. A ring-shaped cathode part 8 is attached to the pin-shaped cathode 6. Glass beads 9 and 10 are fitted in the openings 4 and 5 in a tight manner. Xenon gas as inert gas is filled in the vessel 3.

The pin-shaped cathode 6 includes a cathode core 12 as electrode core, and a lead 13. The cathode core 12 is contained in the vessel 3. The lead 13 protrudes externally from the vessel 3, and is used for wiring to a printed circuit board. A ball-shaped melted portion 14 is formed by welding between the cathode core 12 and the lead 13.

The cathode core 12 is formed from tungsten (W) in a bar shape. A recess or groove 20 is formed in the cathode core 12 for attaching the ring-shaped cathode part 8. The lead 13 is formed from nickel (Ni), and has a diameter equal to or greater than a diameter of the cathode core 12. The ball-shaped melted portion 14 is formed by partially melting the lead 13 to cover an end of the cathode core 12 because of welding between the cathode core 12 and the lead 13.

The cathode core 12 may be formed from materials other than tungsten. Examples of materials for the cathode core 12 are alloy of nickel cobalt and iron, alloy of nickel and iron, and alloy of molybdenum. The lead 13 may be formed from materials other than nickel. Examples of materials for the lead 13 are manganese-nickel (Mn—Ni), alloy of cobalt, nickel and iron, alloy of nickel and iron, and alloy of molybdenum. The pin-shaped anode 7 includes an anode core 16 as an electrode core, a lead 17, and a ball-shaped melted portion 18 all similar to the pin-shaped cathode 6. The anode core 16 has a length different from that of the cathode core 12. Except for this, the pin-shaped anode 7 is produced from the same material and in the same manner as the pin-shaped cathode 6.

The glass beads 9 and 10 are formed in a ring shape. Holes 9a and 10a are formed in the glass beads 9 and 10 for insertion of the cathode core 12 and the anode core 16 of the pin-shaped cathode and anode 6 and 7. The glass beads 9 and 10, after insertion of the cathode core 12 and the anode core 16, are heated by a heater, and welded on to the cathode core 12 and the anode core 16. Then the glass beads 9 and 10 are inserted in the openings 4 and 5 of the vessel 3, heated and melted by a heater, to close and seal the vessel 3 tightly.

The ring-shaped cathode part 8 includes components of metal and a cesium compound. At first, powder of the metal is formed in a ring shape, and sintered. The cesium compound is added to this, and processed. In operation, the ring-shaped cathode part 8 keeps efficiency high in emitting electrons during electric discharge. To fix the ring-shaped cathode part 8, the ring-shaped cathode part 8 is positioned at the recess 20 of the cathode core 12, and then depressed and deformed by caulking for tight attachment.

Figure 3:
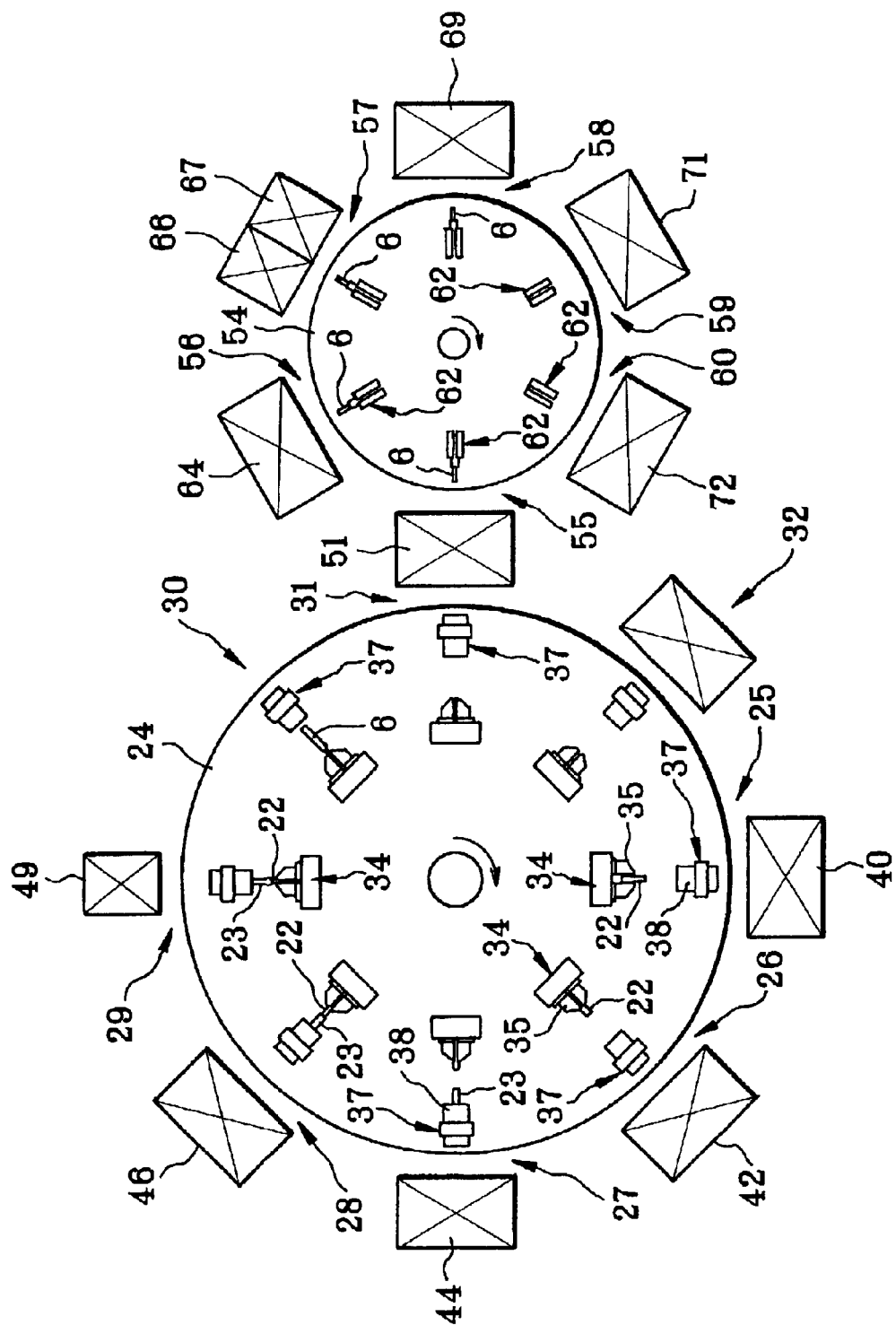
FIG. 3 is a plan illustrating a line for producing a pin-shaped cathode.

In FIG. 3, a line for producing the pin-shaped cathode 6 is schematically illustrated. The producing line is constituted by a welding process and a recess forming process. In the welding process, a tungsten bar 22 as the cathode core 12 is welded on to a nickel bar 23 as the lead 13, to obtain the pin-shaped cathode 6. In the recess forming process, the recess 20 is formed in the cathode core 12 of the pin-shaped cathode 6. For the welding process, the line includes an indexing table 24, and first, second, third, fourth, fifth, sixth, seventh and eighth stations 25, 26, 27, 28, 29, 30, 31 and 32. The indexing table 24 rotates stepwise by a unit angle of 45 degrees. The eight stations 25–32 are disposed where each pallet in the indexing table 24 is stopped. Various devices are disposed in the eight stations 25–32.

Figure 4:
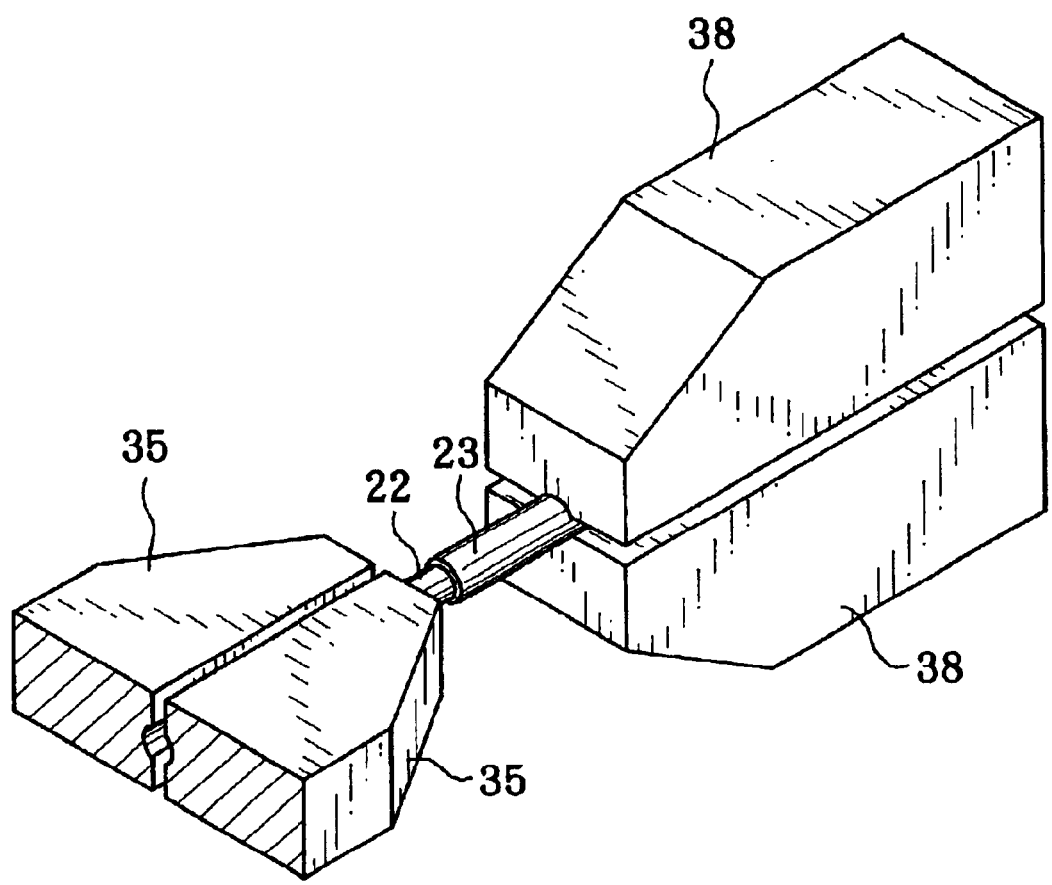
FIG. 4 is a perspective, partially broken, illustrating a chuck for squeezing the pin-shaped cathode.

There are eight chuck mechanisms 34 or two-way chucks, disposed on the indexing table 24, to squeeze the tungsten bar 22. Each of the chuck mechanisms 34 includes two jaws or arms 35, and a shifter for moving the jaws 35 between a first position for squeezing the tungsten bar 22 and a second position for releasing the tungsten bar 22. In FIG. 4, grooves or recesses are formed in contact walls of the jaws 35, have shapes for being fitted on the outer surface of the tungsten bar 22. The recesses make it possible to squeeze the tungsten bar 22 with high precision. Examples of the shifter are a solenoid, cam mechanism and the like. The chuck mechanisms 34 squeeze with such force that the tungsten bar 22 does not offset in the axial direction, and that no flaw or defect will remain in the tungsten bar 22 being captured.

There are eight chuck mechanisms 37 or two-way chucks, disposed on the indexing table 24, opposed to respectively the chuck mechanisms 34, to squeeze the nickel bar 23. Each of the chuck mechanisms 37 includes two jaws or arms 38, and a shifter for moving the jaws 38 between a first position for squeezing the nickel bar 23 and a second position for releasing the nickel bar 23. Grooves or recesses are formed in contact walls of the jaws 38, have shapes for being fitted on the outer surface of the nickel bar 23. The recesses make it possible to squeeze the nickel bar 23 with high precision. Examples of the shifter are a solenoid, cam mechanism and the like. The chuck mechanisms 37 squeeze with such force that the nickel bar 23 does not offset in the axial direction, and that no flaw or defect will remain in the nickel bar 23 being captured.

In FIG. 4, the jaws 35 of the chuck mechanism 34 are movable in a squeezing direction being perpendicular to that in which the jaws 38 of the chuck mechanisms 37 are movable. This is advantageous because the shifters for the chuck mechanisms 34 and 37 can be disposed away from one another, so as to reduce an overall size of the indexing table 24. Also, precision in the concentricity between the tungsten bar 22 and the nickel bar 23 can be high. Furthermore, the chuck mechanisms 34 and 37 constitute welding electrodes, included in a resistance welding device, for connection with the tungsten bar 22 and the nickel bar 23 being squeezed. Examples of the materials for the chuck mechanisms 34 and 37 include chromium copper (Cu—Cr), tungsten copper (Cu—W), superhard material and the like, and a combination of at least two of those, for the purpose of good electrical conductivity.

A tungsten bar supply device 40 is disposed in the first station 25 on the periphery of the indexing table 24, and includes a part feeder, and a pick-&-placement mechanism or picking mechanism. The part feeder aligns the tungsten bar 22 produced by a separate manufacturing line. The pick-&-placement mechanism picks the tungsten bar 22 from the part feeder individually, and sends the tungsten bar 22 to a space between the jaws 35 of the chuck mechanism 34.

A protrusion adjusting device 42 is disposed at the second station 26, for adjusting a length Ls at which the tungsten bar 22 protrudes from an end of the chuck mechanism 34. For the operation of the protrusion adjusting device 42, the length Ls is predetermined and stored. Before the protrusion adjusting device 42 is actuated, the tungsten bar supply device 40 causes the chuck mechanism 34 in such a manner that the tungsten bar 22 protrudes from the chuck mechanism 34 at a protruding amount sufficiently greater than the length Ls. Then the protrusion adjusting device 42 is controlled to slide the tungsten bar 22 in a direction toward the inside of the chuck mechanism 34, to reduce the protruding amount to the length Ls.

Figure 5A:
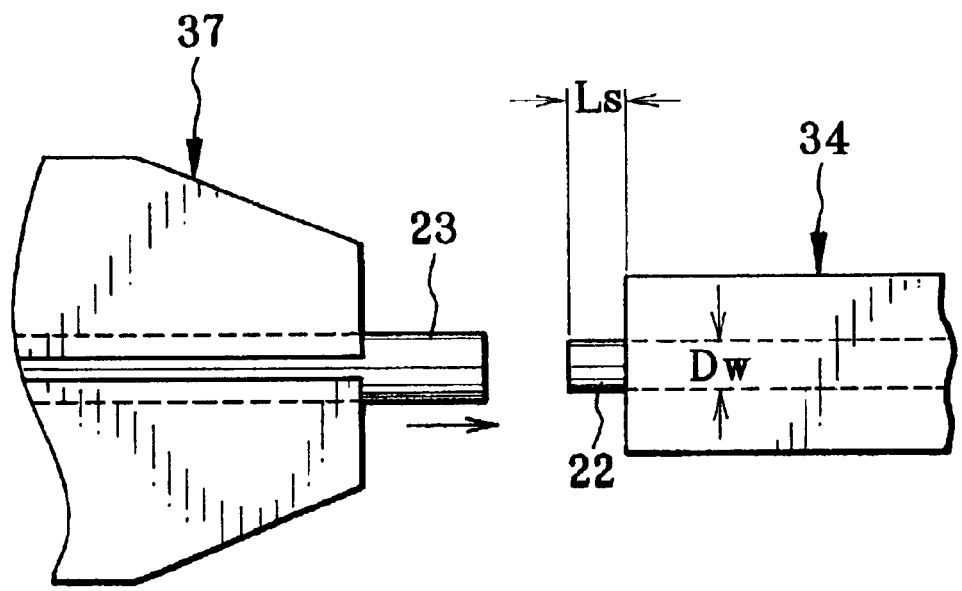
FIG. 5A is an explanatory view in elevation, illustrating positioning of a cathode core and a lead relative to one another.

A nickel bar supply device 44 is disposed in the third station 27. At first, nickel wire with a continuous length and a constant width is produced, wound about a reel, and set in the nickel bar supply device 44. The nickel bar supply device 44 draws the nickel wire from the reel, and uncurls the nickel wire by use of a frictional roller or the like. Then the nickel wire is wiped with solvent and non-woven cloth or other fibrous wiping material, to remove dust, powdery dirt, oil component and the like. After this, the nickel bar 23 is produced by cutting the nickel wire at a predetermined length. The nickel bar 23 is obtained, is transferred to the chuck mechanism 37 by a pick-&-placement mechanism, and is squeezed by the jaws 38. In FIG. 5A, ends of the tungsten bar 22 and the nickel bar 23 are opposed to one another.

Figure 5B:
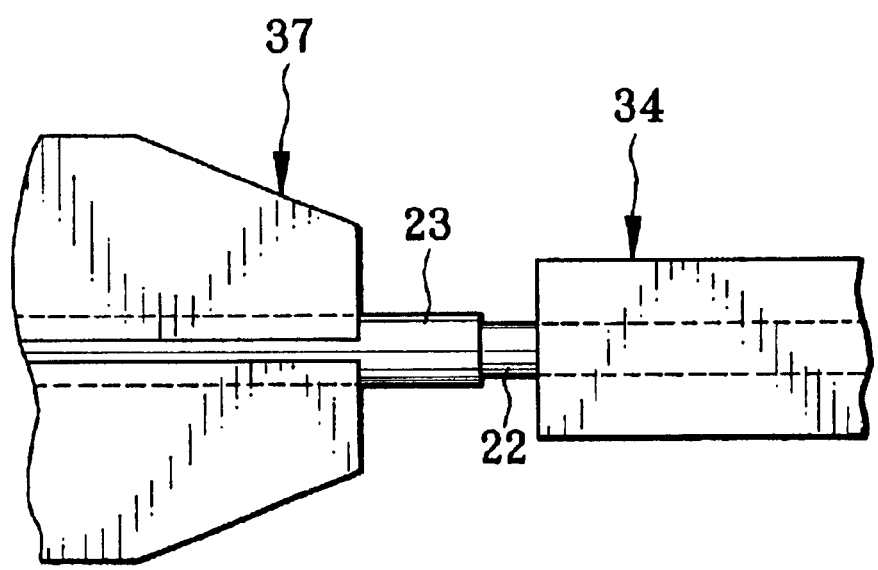
FIG. 5B is an explanatory view in elevation, illustrating butting between the cathode core and the lead.

A butting device 46 is disposed at the fourth station 28, and operates to shift the chuck mechanism 37 toward the chuck mechanism 34. In FIG. 5B, an end of the nickel bar 23 is advanced to butt on an end of the tungsten bar 22. A spring is incorporated in the butting device 46, and exerts normally constant force to press the nickel bar 23 against the tungsten bar 22.

Figure 6:
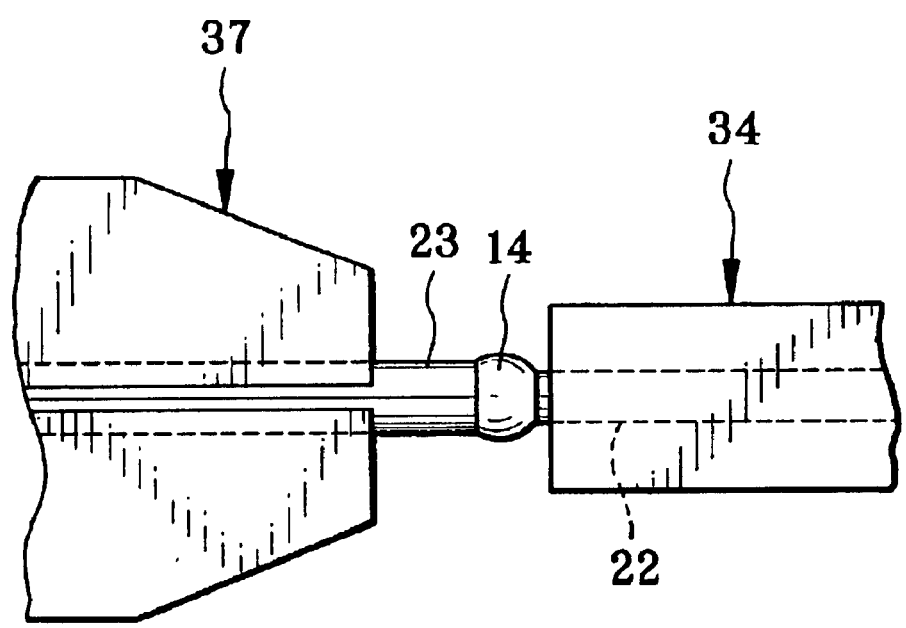
FIG. 6 is an explanatory view in elevation, illustrating welding between the cathode core and the lead.

A resistance welding device 49 is disposed at the fifth station 29. The resistance welding device 49 causes a current to flow between the chuck mechanisms 34 and 37. In FIG. 6, the tungsten bar 22 and the nickel bar 23 are heated because of the current and pressure. The end of the nickel bar 23 is melted to wrap an end of the tungsten bar 22 so as to weld the tungsten bar 22 and the nickel bar 23 to each other. Note that the current flows in a direction from the chuck mechanism 34 to the chuck mechanism 37 for the purpose of generating heat according to the Peltier effect.

In the sixth station 30, the nickel bar 23 is released from being squeezed in the chuck mechanism 37. The chuck mechanism 37 comes away from the chuck mechanism 34. In the seventh station 31, a pick-&-placement device 51 is disposed, for receiving the pin-shaped cathode 6 from the chuck mechanism 34, to supply the pin-shaped cathode 6 to a station for the recess forming process. Note that, if an alarm signal is generated in the resistance welding device 49 or other devices at the time of the welding, the pin-shaped cathode 6 is fed to the eighth station 32 without moving to a region for the recess forming process. In the eighth station 32, the chuck mechanism 34 is opened to eliminate the pin-shaped cathode 6 determined unacceptable, for collection of failing electrodes.

For the recess forming process, there are an indexing table 54 and first, second, third, fourth, fifth and sixth stations 55, 56, 57, 58, 59 and 60. The indexing table 54 has a smaller diameter than that of the indexing table 24, and rotates stepwise by a unit angle of 60 degrees. The six stations 55-60 are disposed where each pallet in the indexing table 54 is stopped.

There are six electrode chucks 62, disposed on the upper face of the indexing table 54, for squeezing the lead 13 of the pin-shaped cathode 6, namely the nickel bar 23 after welding. The electrode chucks 62 include a pair of jaws or arms, and a shifter. The jaws squeeze the lead 13. The shifter moves the jaws between a first position for grasping the lead 13 and a second position for releasing the lead 13. An example of the shifter includes a solenoid, cam mechanism or the like.

At the first station 55 on the periphery of the indexing table 54, the pick-&-placement device 51 supplies the pin-shaped cathode 6 from the seventh station 31 of the welding process. The pin-shaped cathode 6 is squeezed by the electrode chuck 62. An electrode positioning device 64 is disposed at the second station 56, and adjusts a position of the pin-shaped cathode 6 nipped by the electrode chuck 62.

Figure 7A:
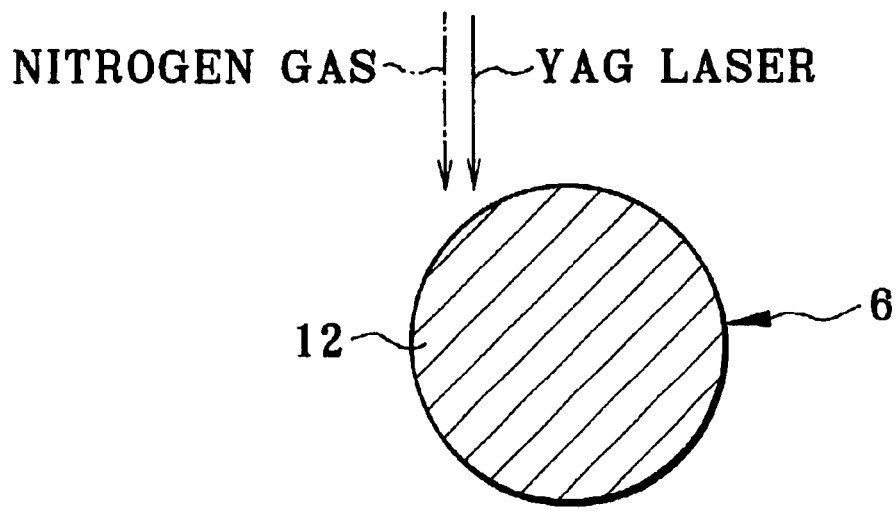
FIG. 7A is a cross section illustrating a state of the pin-shaped cathode to which laser light is applied.
Figure 7B:
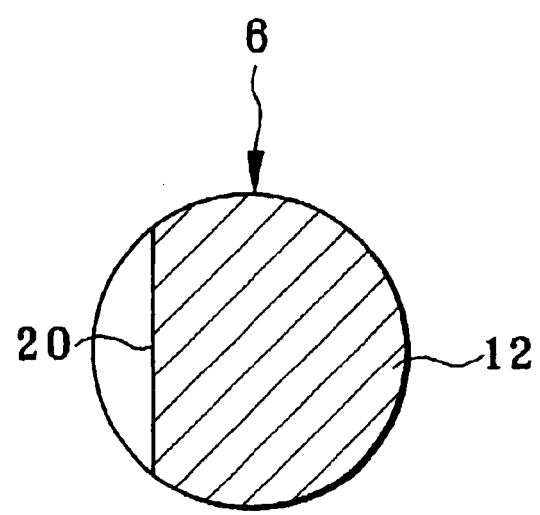
FIG. 7B is a cross section illustrating a state of the pin-shaped cathode after a recess is formed.

There are a laser processing device 66 and a gas ejecting device 67 disposed at the third station 57. The laser processing device 66 consists of a laser system of YAG (yttrium aluminum garnet) laser, and as illustrated in FIG. 7A, emits laser light toward the cathode core 12 of the pin-shaped cathode 6, so as to form the recess 20. See FIG. 7B. The gas ejecting device 67 ejects nitrogen gas toward the pin-shaped cathode 6 while the laser light forms the recess 20, to blow away dust of melted tungsten from the pin-shaped cathode 6 to eliminate residual dust therefrom.

A shape inspecting device 69 is disposed at the fourth station 58. The shape inspecting device 69 includes a video camera unit and a control unit. The video camera unit picks up an image of the pin-shaped cathode 6 to obtain image data. The control unit stores reference data, compares the image data from the video camera unit with the reference data, to determine a size of the recess 20, or acceptability of a shape of the recess 20.

In the fifth station 59, the electrode chuck 62 is opened, from which the pin-shaped cathode 6 is unloaded. A product receptacle or container 71 is disposed at the fifth station 59, and receives the pin-shaped cathode 6, and transfers the same to a succeeding line for producing a flash discharge tube. If the pin-shaped cathode 6 is determined unacceptable in the shape inspecting device 69 at the fourth station 58, the pin-shaped cathode 6 moves past the fifth station 59 without unloading from the electrode chuck 62. When the pin-shaped cathode 6 reaches the sixth station 60, the pin-shaped cathode 6 is removed from the electrode chuck 62 at the sixth station 60. An failure product receptacle or container 72 at the sixth station 60 receives the pin-shaped cathode 6, and collects electrodes created one after another. Note that a producing line for the pin-shaped anode 7 is the same as that for the pin-shaped cathode 6 except for lack of partial elements including the seventh station 31 and the recess forming process. For details of the producing line for the pin-shaped anode 7, see the description of that for the pin-shaped cathode 6.

Figure 8:
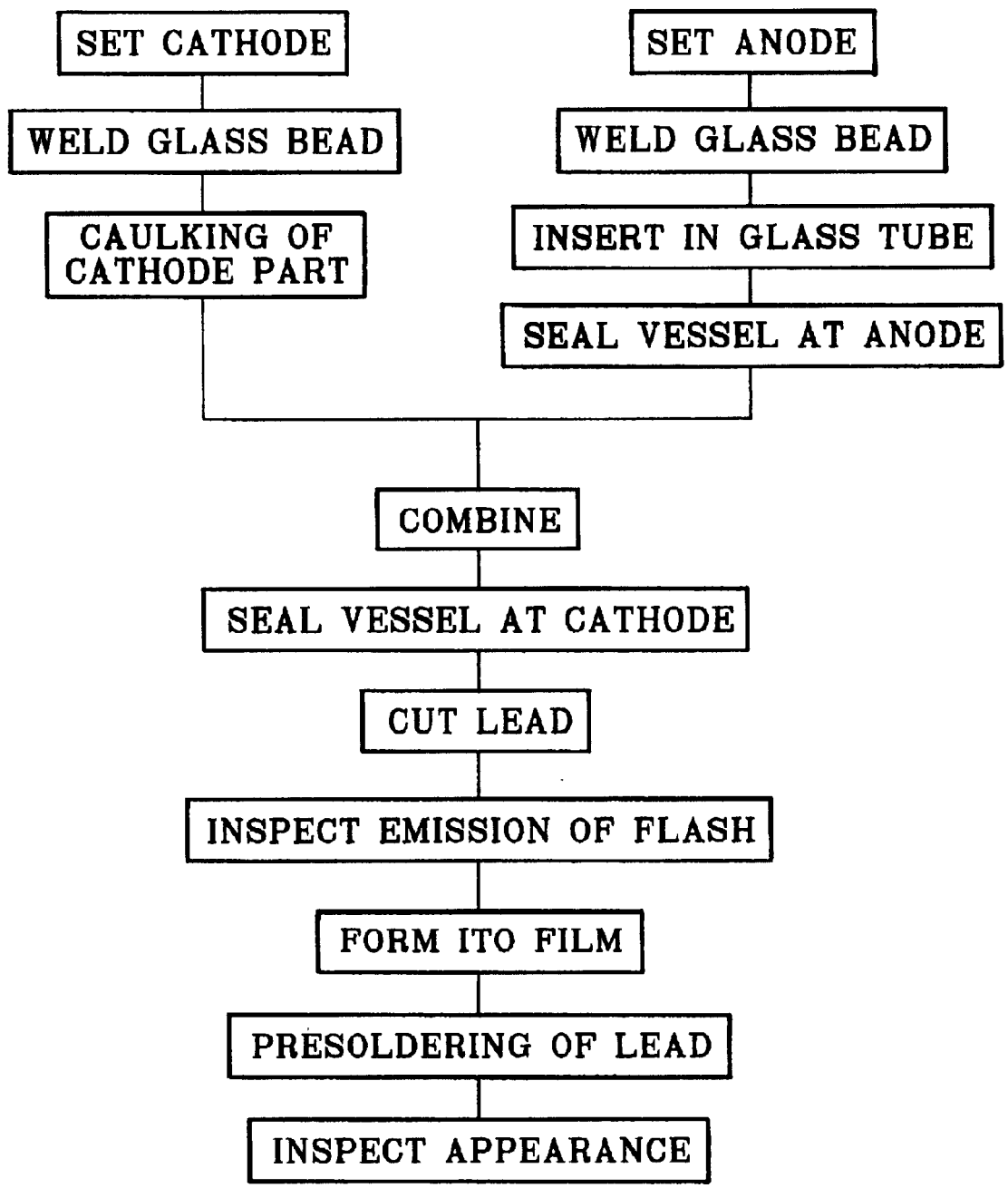
FIG. 8 is a flow chart illustrating a process of producing the flash discharge tube.
Figure 9A:
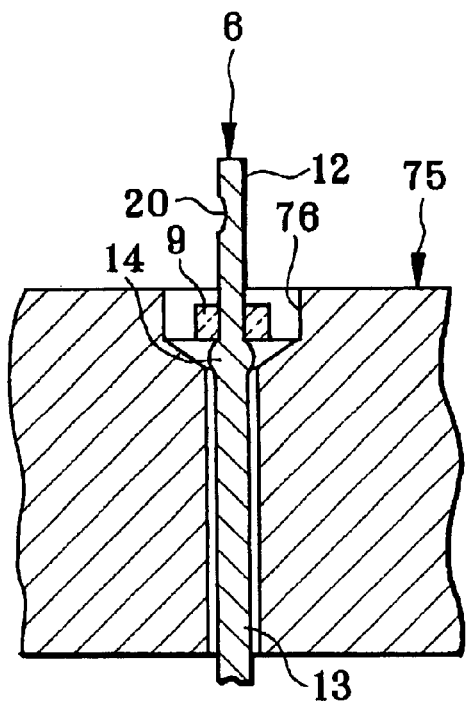
FIG. 9A is an explanatory view in vertical section, illustrating a state with a glass bead attached to the pin-shaped cathode located on a heating support plate.

The pin-shaped cathode 6 and the pin-shaped anode 7 are transferred to a line for producing a flash discharge tube. In FIG. 8, a flow of steps is illustrated, according to which the producing line produces the flash discharge tube. In FIG. 9A, a heating support plate 75 or heater jig is illustrated, and includes hundreds of retention holes 76. The pin-shaped cathode 6 supplied to the producing line is inserted into each of the retention holes 76 by advancing the lead 13. The heating support plate 75 has a plate shape, is formed from carbon, and includes the retention holes 76 aligned regularly. The hundreds of the pin-shaped cathodes 6 are treated at the same time in the heating support plate 75.

While the pin-shaped cathode 6 is supported on the heating support plate 75, the glass bead 9 is supplied so that the cathode core 12 of the pin-shaped cathode 6 is inserted in the glass bead 9. The pin-shaped cathode 6, the glass bead 9 together with the heating support plate 75 are supplied with heat by a heater. Therefore, the glass bead 9 is melted and welded on to the pin-shaped cathode 6.

Figure 9B:
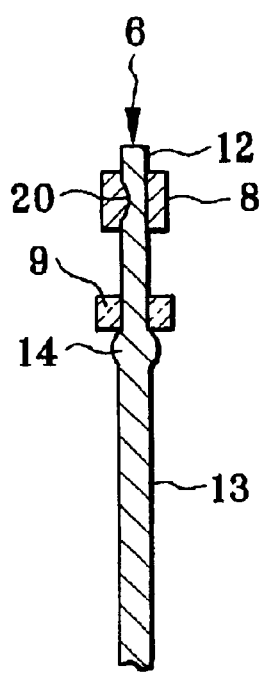
FIG. 9B is an explanatory view in vertical section, illustrating a state with a ring-shaped cathode part attached to the pin-shaped cathode.

In FIG. 9B, the cathode core 12 of the pin-shaped cathode 6 is inserted in the ring-shaped cathode part 8, which is depressed and deformed according to a technique of caulking, and is attached fixedly to the pin-shaped cathode 6. An example of the caulking method and device used herein is disclosed in JP-A 6-230456.

In a manner similar to the pin-shaped cathode 6, the pin-shaped anode 7 is set on the heating support plate 75. The glass bead 10 is melted and welded. Then the vessel 3 is supplied to the pin-shaped anode 7, receives insertion of the pin-shaped anode 7, and is heated by the heater again. Then the glass bead 10 and the vessel 3 are melted and welded together, to fix the pin-shaped anode 7 on the vessel 3.

Figure 10:
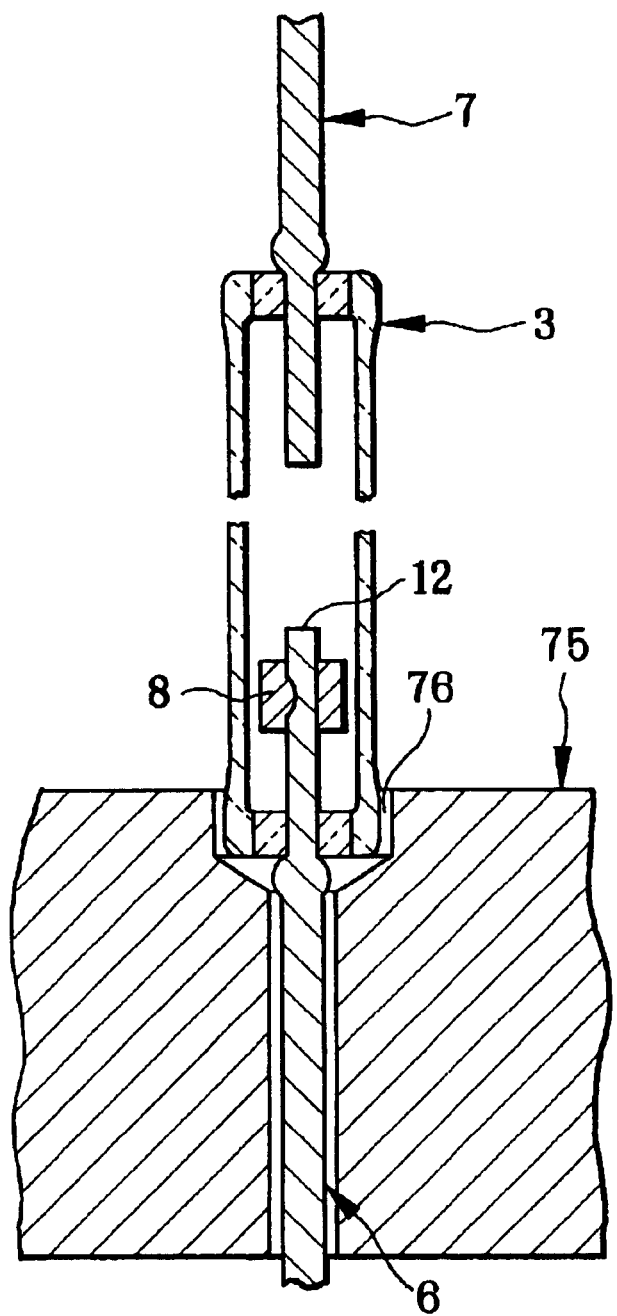
FIG. 10 is an explanatory view in vertical section, illustrating sealing of a glass vessel.

Then the pin-shaped cathode 6 is inserted in the vessel 3 supported in the heating support plate 75. The portion of the vessel 3 with the pin-shaped cathode 6 is held by the heating support plate 75, and is heated. See FIG. 10. The heat is applied in a condition filled with xenon gas. The vessel 3 is closed and sealed. At the same time, xenon gas is enclosed in the flash discharge tube 2. After completing the flash discharge tube, the lead 13 of the pin-shaped cathode 6 and the lead 17 of the pin-shaped anode 7 are cut down at a predetermined length. The flash discharge tube is subjected to inspection of flash emission. If the flash discharge tube 2 is determined acceptable after the inspection, then the vessel 3 is coated with a film of ITO (indium tin oxide). Appearance of the flash discharge tube 2 is inspected, before the flash discharge tube 2 is shipped out.

EXAMPLES

Figure 11:
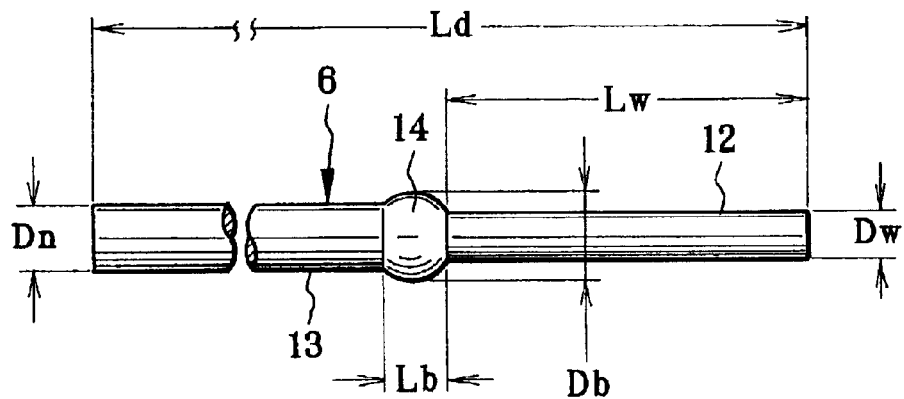
FIG. 11 is a front elevation, partially broken, illustrating sizes of the pin-shaped cathode.

In FIG. 11, the cathode core 12 of the pin-shaped cathode 6 has a diameter Dw of 0.6 mm, and a length Lw of 4.5 mm. The lead 13 has a diameter Dn of 0.8 mm. The pin-shaped cathode 6 has a total length Ld of 19.5 mm. The ball-shaped melted portion 14 has a diameter Db of 0.95–1.13 mm, and a size Lb that is preferably 0.8 mm in the axial direction of the electrode. The pin-shaped anode 7 is different from the pin-shaped cathode 6 in that the anode core 16 has a length of 3.5 mm and the pin-shaped anode 7 has a total length of 18.5 mm. Except for those, the pin-shaped anode 7 has the same sizes as those of the pin-shaped cathode 6.

In the pin-shaped cathode 6, the size Lb of the ball-shaped melted portion 14 is an important factor in view of maintaining quality of the flash discharge tube 2. The ball-shaped melted portion 14 is used for positioning the pin-shaped cathode 6 on the vessel 3. Should the size Lb be too great, the length Lw of the cathode core 12 will be too small. Should the size Lb be too small, the length Lw of the cathode core 12 will be too great. So a distance between the cathode core 12 and the anode core 16 is likely to be uneven. An arc length of the electric discharge may change. Consequently, it is preferable that the ball-shaped melted portion 14 has a shape of an ellipsoid like a pumpkin fruit defined by compressing a sphere in one direction, in comparison with a shape of an ellipsoid like a rugby ball defined by extending a sphere in one direction. In other words, the ball-shaped melted portion 14 should meet the condition of Lb<Db instead of Lb>Db.

A great number of electrodes 6 were produced in combination of the tungsten bar 22 and the nickel bar 23 by changing conditions of welding for obtaining optimum condition to manufacture the ball-shaped melted portion 14 regularly at the above described size. As a result, it was observed that the shape of the ball-shaped melted portion 14 depended on various factors, that were the protruding amount Ls of the tungsten bar 22 from the end of the chuck mechanism 34, the force of the tungsten bar 22 to push the nickel bar 23, the voltage applied for the resistance welding, and the time of applying the voltage.

According to the above results of the observation, the tungsten bar 22 and the nickel bar 23 were welded to one another in such a manner as to maintain the ball diameter Db at approximately 1 mm by changing the protruding amount Ls of the tungsten bar 22 and the voltage. Then the length Lw of the electrode, the ball diameter Db and the ball size Lb were measured, and indicated in the graph of FIG. 12. Note that ten samples of electrodes were produced experimentally for measurement. Values indicated in FIG. 12 were averages of the ten. In FIG. 13, a pattern of applying voltage is illustrated. The tungsten bar 22 and the nickel bar 23 were preheated at a preheating voltage level P3 for 40 msec, and heated at a heating voltage level P4 for 55 msec for a main process of welding by melting the nickel bar 23.

Figure 12:
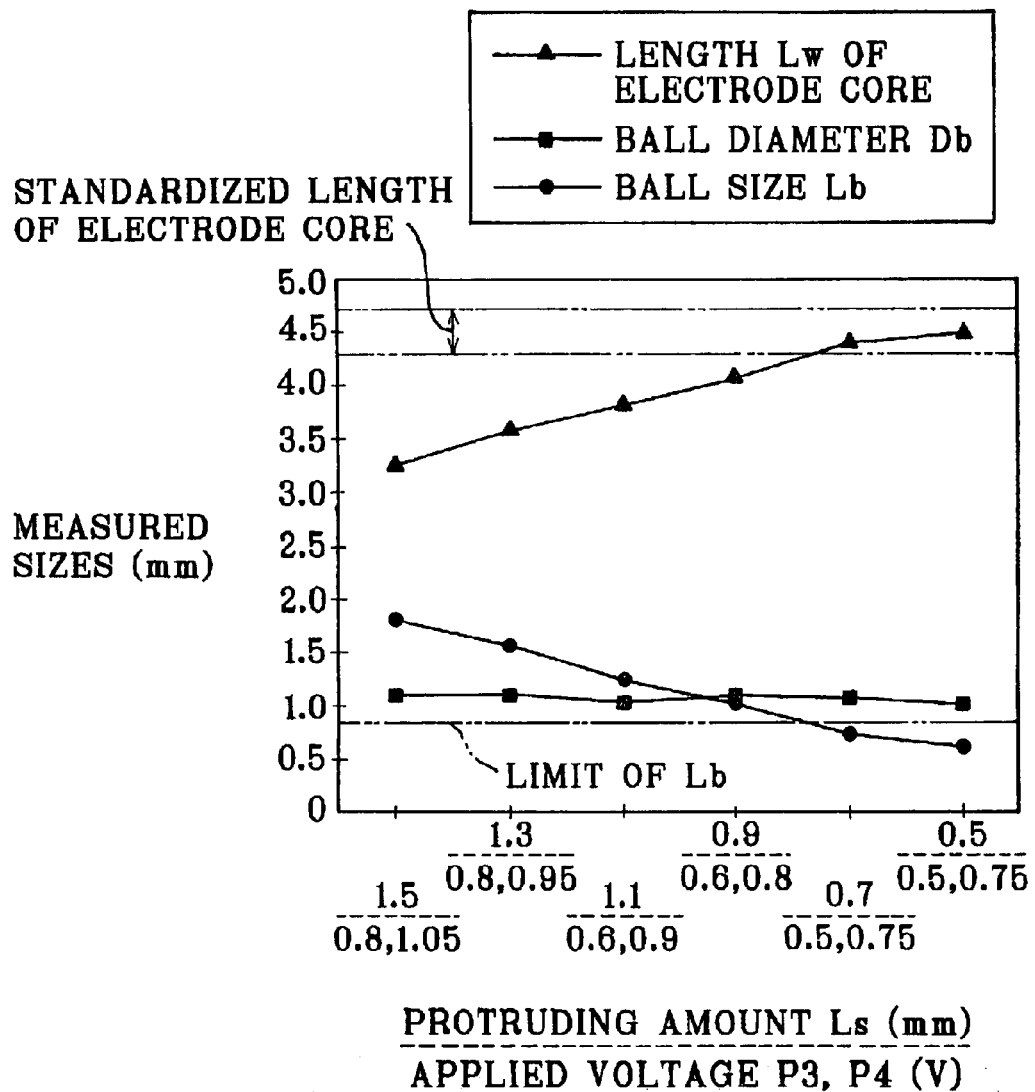
FIG. 12 is a graph illustrating a relationship between a protruding amount of the cathode core and a shape of a ball-shaped melted portion.
Figure 13:
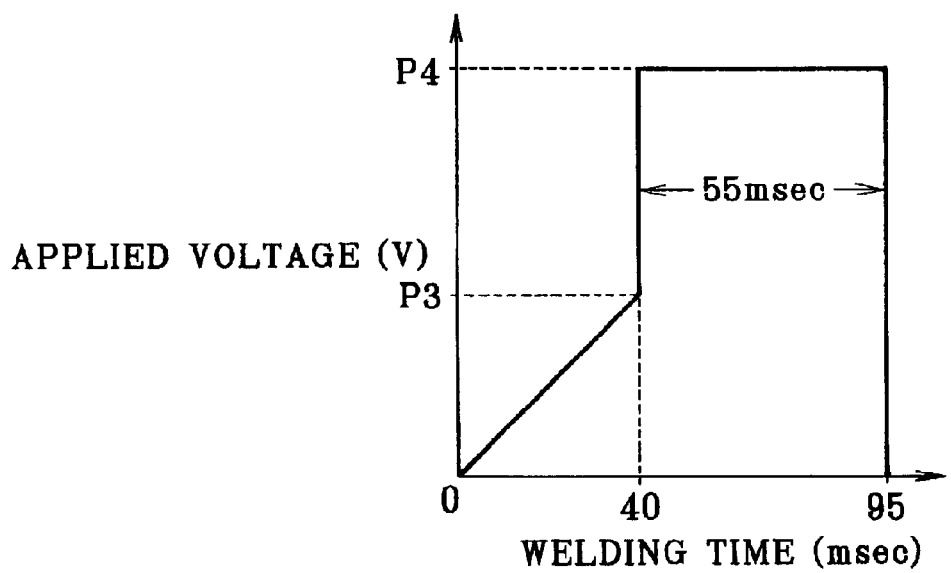
FIG. 13 is a graph illustrating a pattern of applying welding voltage.

According to the data in FIG. 12, it was found that ball diameter Db could be kept constant by changing the voltage even with changes in the protruding amount Ls. Also, the ball size Lb became the greater according to an increase of the protruding amount Ls. The electrode core length Lw became the smaller in inverse proportion to the increase of the protruding amount Ls. It is supposed that reason for this result was that portions of the tungsten bar 22 and the nickel bar 23 other than butting portions of the tungsten bar 22 and the nickel bar 23 were heated by a flow of a current. It was found that the protruding amount Ls of the tungsten bar 22 was preferably in a range from 0.8·Dw to 1.5·Dw, and preferably 0.7 mm or so.

Figure 14:
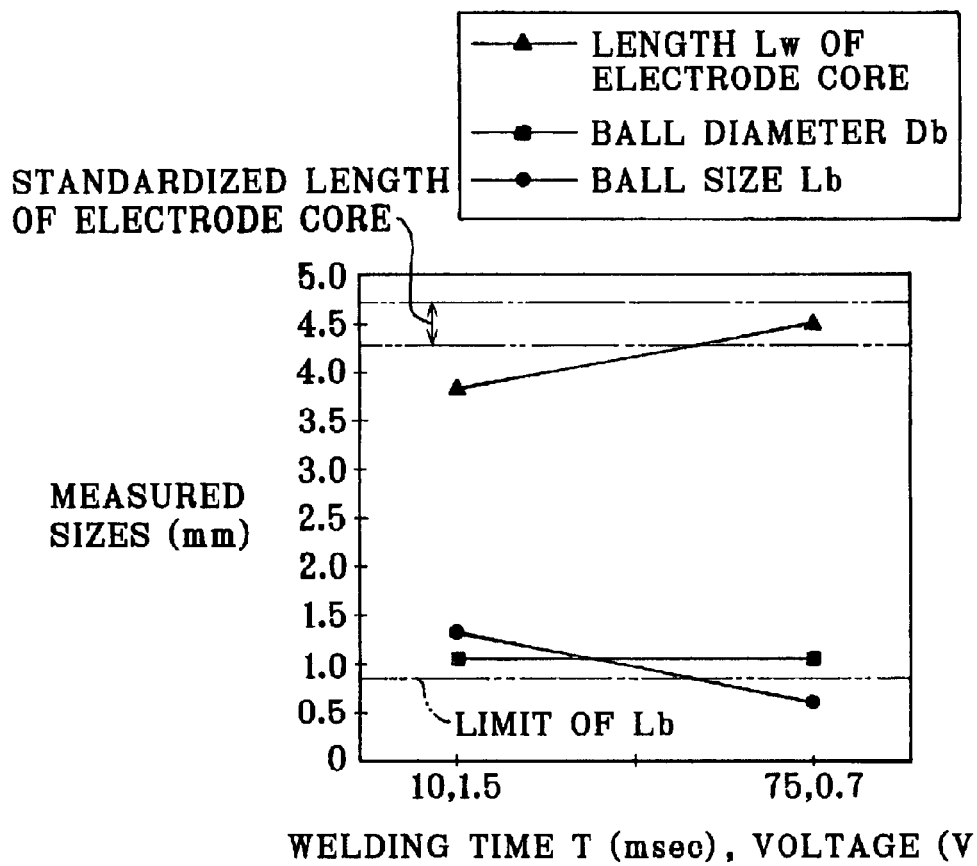
FIG. 14 is a graph illustrating a relationship between welding time and a shape of a ball-shaped melted portion.
Figure 15:
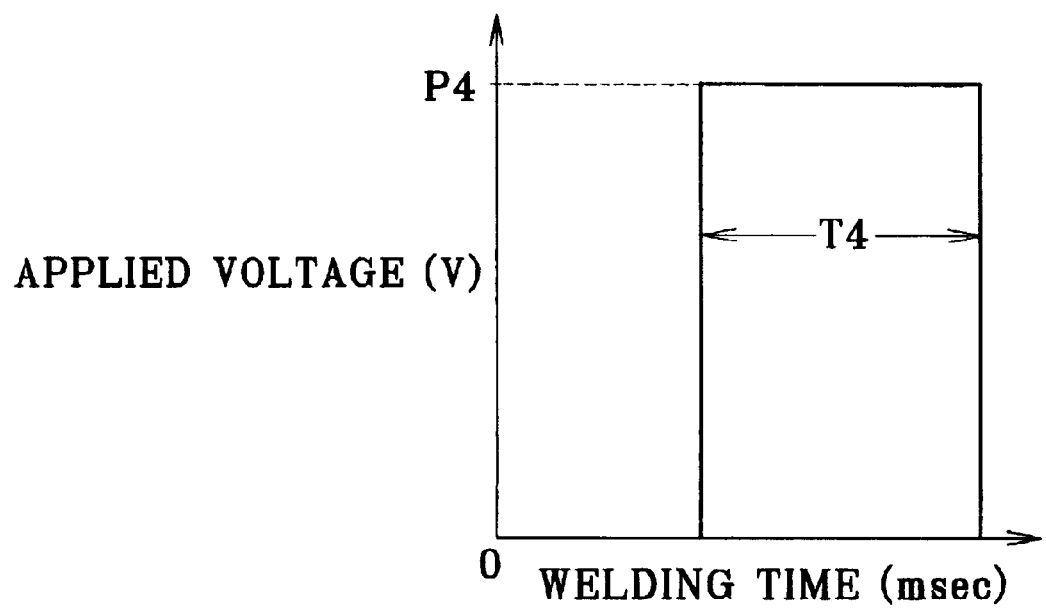
FIG. 15 is a graph illustrating another preferred pattern of applying welding voltage.

Furthermore, the experiment was conducted with other samples. To check a relationship between the shape of the ball-shaped melted portion 14 and the welding time, the protruding amount Ls of the tungsten bar 22 was uniquely determined 0.7 mm. The welding time was determined 10 msec and 75 msec. The length Lw of the electrode, the ball diameter Db and the ball size Lb were measured. Note that ten samples of electrodes were produced experimentally for measurement. Values indicated in FIG. 14 were averages of the ten. In FIG. 15, a pattern of applying voltage is illustrated. The tungsten bar 22 and the nickel bar 23 were heated at a heating voltage level P4 for T4 (msec) for a main welding by melting the nickel bar 23.

As a result of the experiment, the nickel bar 23 was melted only when the voltage P3 was set at nearly 1.5 volts or higher and when the welding time was 10 msec. When the welding time was 75 msec, the nickel bar 23 was melted when the voltage was as low as 0.7 volt. If the welding time is short, voltage to be applied must be set high. In the experiment in which the voltage was high, portions of the tungsten bar 22 and the nickel bar 23 different from the butting portions was heated remarkably to cause the ball-shaped melted portion 14 to have a shape of an ellipsoid like a rugby ball defined by extending a sphere in one direction. When the welding time was long, the ball-shaped melted portion 14 came to have a shape of an ellipsoid like a pumpkin fruit defined by compressing a sphere in one direction. However, problems are likely to occur because of oxidization and eccentricity in the pushing direction. This being so, it was found that a preferable value of the welding time was nearly 50 msec. Note that a preferable condition of welding was the same in the case of the pin-shaped anode 7.

Sample S

Figure 16:
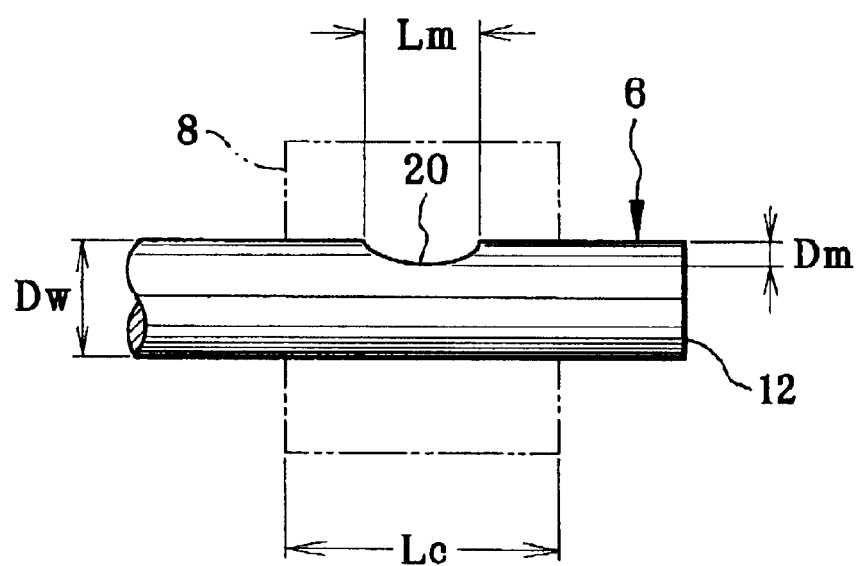
FIG. 16 is a front elevation, partially broken, illustrating a recess.

In FIG. 16, the recess 20 for attaching the ring-shaped cathode part 8 had a width of Lm and a depth of Dm. Specifically, the recess 20 had Lm=0.4 mm and Dm=0.05 mm. To obtain those sizes, the laser processing device 66 and the gas ejecting device 67 were operated in the conditions as follows:

| Laser output energy | 6 J |
| Pulse width | 3 msec |
| Beam diameter | 0.6 mm |
| Gas flow rate | 20 liters per minute |

Sample No. 1

As a variant of Sample S, the recess 20 had Lm=0.58 mm and Dm=0.13 mm. To obtain those sizes, the laser processing device 66 and the gas ejecting device 67 were operated in the conditions as follows:

| Laser output energy | 14.7 J |
| Pulse width | 1 msec |
| Beam diameter | 0.6 mm |
| Peak of output | 3.8 kw |
| Focal length | 55 mm |
| Gas flow rate | 30 liters per minute |

Sample No. 2

Figure 17:
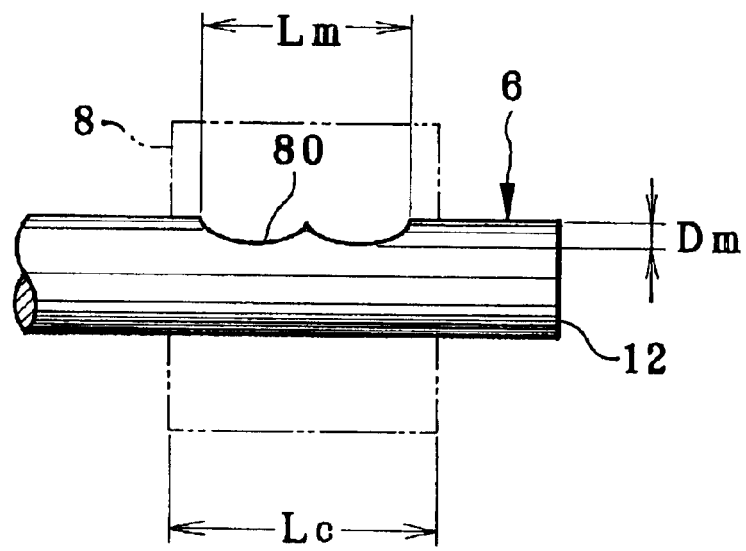
FIG. 17 is a front elevation, partially broken, illustrating a double recess formed by laser applied two times.

Furthermore, Sample No. 2 as an example had a double recess or groove 80 as illustrated in FIG. 17. A laser beam was applied two times to different positions in the cathode core 12. The double recess 80 had Lm=1.10 mm and Dm=0.13 mm. A comparative example according to the prior art is referred to as Sample No. 3. To any of Samples Nos. 1, 2 and 3, the ring-shaped cathode part 8 was attached by caulking, and was subjected to measurement of force required for pulling away. Results of those were obtained, and are indicated in Table 1.

| | Samples | | |
| --- | --- | --- | --- |
| | No. 1 | No. 2 | No. 3 |
| No. Of Electrodes | 13 | 17 | 10 |
| Average Force (kgf) For Being Drawn Away | 1.28 | 1.35 | 1.41 |
| Maximum Force (kgf) For Being Drawn Away | 1.85 | 1.70 | 2.00 |
| Minimum Force (kgf) For Being Drawn Away | 0.74 | 0.91 | 0.85 |

Figure 18:
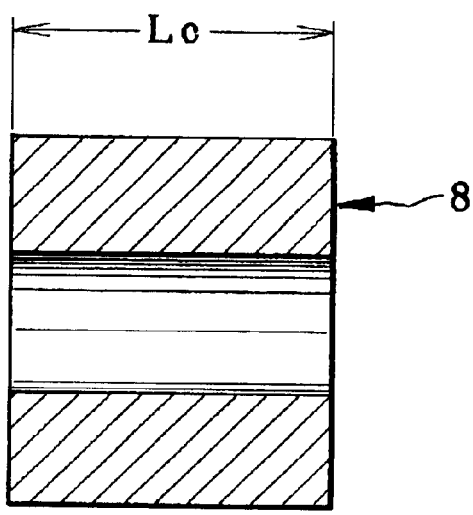
FIG. 18 is a vertical section illustrating a size of the cathode.

In view of designing the electrode, the force required for drawing away the ring-shaped cathode part 8 should be 1 kgf or higher at an average level, and at least 0.5 kgf or higher, for the purpose of tight attachment. In the present examples, it was possible that the average force required for drawing away the ring-shaped cathode part 8 was 1 kgf or higher at the average, and at least 0.5 kgf or higher after forming the recess with laser. According to the above results, it was found that conditions of Lm and Dm indicated below could be satisfied by forming the recess. Note that Lc is a size of the ring-shaped cathode part 8 in the axial direction. See FIG. 18.

$$0.1Lc \leq Lm \leq 0.8Lc$$

$$0.03Dw \leq Dm \leq 0.4Dw$$

The recess 20 or the double recess 80 can have any one of elliptical, oval, quadrilateral shapes or the like. The number of unit gaps in the recess 20 or the double recess 80 may be in a range of 1-6 for the purpose of raising the force required for drawing away.

In the above embodiment, the recess 20 is formed in the pin-shaped cathode 6 to tighten the attachment of the ring-shaped cathode part 8. Furthermore, the pin-shaped cathode 6 can be subjected to sandblast finish and provided with surface roughness (in $\mu$m) for the same purpose. Table 2 indicates surface roughness obtained by sandblast finish of the tungsten bar 22 by use of shots having shot diameters of #46 and #60. Note that the sandblast method included steps of setting a plurality of the tungsten bars 22 in a colander, net, basket or a suitable receptacle, rotating the receptacle at a low rotational speed, and blowing the shots to the tungsten bars 22 at a prescribed pressure of air. In addition to the blast time, the method satisfied remaining conditions of blast, as follows:

| | |
|---|---|
| Air blowing pressure | 2 kgf/cm$^2$ |
| Number of rotations of receptacle | 40 rpm |
| Number of the tungsten bars 22 | 30,000 |
| Length of the tungsten bars 22 | 5.1 mm |
| Material of shots | alumina |

| Diameter Of Shots | #46 | | | #60 | | |
|---|---|---|---|---|---|---|
| Blast Time | Ra | Rmax | Rz | Ra | Rmax | Rz |
| 1 Min. | 0.42 | 8.08 | 5.10 | 0.27 | 5.53 | 4.67 |
| 3 Min. | 0.64 | 9.55 | 6.18 | 0.64 | 8.76 | 6.34 |
| 5 Min. | 0.78 | 11.09 | 7.39 | 0.67 | 9.36 | 6.27 |
| 10 Min. | 0.93 | 12.57 | 8.51 | 0.82 | 10.21 | 7.21 |
| 15 Min. | 1.07 | 13.52 | 9.08 | 0.95 | 10.94 | 8.03 |

In conclusion, sufficient surface roughness was obtained as Ra$\geq$0.9 $\mu$m and Rmax$\geq$10 $\mu$m when the blast time was 10–15 minutes. This surface roughness is equal to or higher than that of conventional products. Thus, it is estimated that the force required for drawing away of at least 1 kgf can be obtained. Also, the sandblast finish is additionally effective in facilitating the welding, because all the surface of the tungsten bar 22 including its end faces are roughened. It is also possible to subject the sandblast method to the pin-shaped cathode 6 after the tungsten bar 22 is welded to the nickel bar 23. This is additionally effective, because the sandblast method can remove surplus nickel flash created on a surface of the melted ball at the time of welding.

In the above embodiments, the electrode core 12, 16, 22 has a diameter Dw, and the protruding amount Ls of the electrode core 12, 16, 22 from the first chuck mechanism 34 is from 0.8·Dw to 1.5·Dw. However, the protruding amount Ls of the electrode core 12, 16, 22 from the first chuck mechanism 34 can be from 0.6·Dw to 1.5·Dw. In the above embodiments, the cathode part 8 has a size Lc in an axial direction, and the recess 20, 80 has a width Lm from 0.1·Lc to 0.8·Lc in the axial direction. However, the recess 20, 80 can have a width Lm from 0.1·Lc to 1.5·Lc in the axial direction.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An electrode producing method of producing a pin-shaped electrode for a flash discharge tube, said pin-shaped electrode including a first bar of metal having a first end portion, and a second bar of metal having a second end portion connected with said first end portion, said electrode producing method comprising steps of:

retaining said first and second bars by use of respectively first and second chuck mechanisms with said first and second end portions opposed to one another;

pushing said first and second end portions on one another by moving at least one of said first and second chuck mechanisms; and while said first and second end portions are pushed on one another, supplying said first and second chuck mechanisms with electric current, so as to weld said first and second bars together therewith by resistance welding, wherein said first bar has a diameter Dw, and said protruding amount of said first bar from said first chuck mechanism is from 0.6 Dw to 1.5 Dw.

2. An electrode producing method as defined in claim 1, wherein in said welding step, said second end portion is melted to form a ball-shaped melted portion, said ball-shaped melted portion is secured by wrapping said first end portion.

3. An electrode producing method as defined in claim 2, wherein said flash discharge tube includes:

a vessel having discharge gas enclosed therein;

a second pin-shaped electrode inserted through and secured to said vessel;

said pin-shaped electrode is inserted through said vessel, said second bar extends externally from said vessel, said first bar is disposed in said vessel, and opposed to said second pin-shaped electrode;

said ball-shaped melted portion is positioned on an outer surface of said vessel.

4. An electrode producing method as defined in claim 2, further comprising a step of adjusting a protruding amount of said first bar from said first chuck mechanism before said second chuck mechanism supplies said second bar.

5. An electrode producing method as defined in claim 4, wherein said ball-shaped melted portion after welding has a greater diameter than a thickness thereof as viewed in an axial direction of said pin-shaped electrode.

6. An electrode producing method as defined in claim 5, wherein said first and second chuck mechanisms include first and second two-way chucks, said first two-way chuck squeezes said first bar in a first squeezing direction, said second two-way chuck squeezes said second bar in a second squeezing direction, said first and second squeezing directions are substantially perpendicular to one another.

7. An electrode producing method as defined in claim 1, wherein said first bar includes tungsten.

8. An electrode producing method as defined in claim 1, wherein said pin-shaped electrode is a pin-shaped cathode, and further includes a ring-shaped cathode part secured to said first bar;

further comprising steps of:

subjecting a surface of said first bar to surface processing; and securing said cathode part to said first bar after said surface processing.

9. An electrode producing method as defined in claim 8, wherein said surface processing step includes forming a recess in said first bar;

in said securing step, said cathode part is secured to said recess.

10. An electrode producing method as defined in claim 9, wherein in said surface processing step, laser light is used to form said recess.

11. An electrode producing method as defined in claim 8, wherein said surface processing is sandblast processing for providing said first bar with surface roughness;

further comprising a step of pressurizing and deforming said cathode pail, to attach said cathode part to said first bar.

12. An electrode producing method of producing a pin-shaped electrode for a flash discharge tube, said pin-shaped electrode including a first bar of metal and a ring-shaped cathode part, secured to said first bar, said electrode producing method comprising steps of:

forming a concave-shaped recess in said first bar by applying laser light thereto;

securing said cathode part to said recess.

13. An electrode producing method as defined in claim 12, further comprising a step of blowing gas over said first bar during said recess forming step, to blow away metal dust created by forming said recess.

14. An electrode producing method as defined in claim 13, wherein said first bar has a first end portion disposed on a farther side from said cathode part;

said pin-shaped electrode further includes a second bar of metal having a second end portion connected with said first end portion;

further comprising a step of connecting said second bar with said first bar before said recess forming step.

15. An electrode producing method as defined in claim 14, wherein said cathode part has a size Lc in an axial direction of said pin-shaped electrode, and said recess has a width from 0.1·Lc to 1.5·Lc in said axial direction.

16. An electrode producing method as defined in claim 14, wherein said first bar has a diameter Dw, and said recess has a depth from 0.03·Dw to 0.4·Dw.

17. An electrode producing method as defined in claim 16, wherein said cathode part includes cesium.

18. An electrode producing method of producing a pin-shaped electrode for a flash discharge tube, said pin-shaped electrode including a first bar of metal and a ring-shaped cathode part, secured to said first bar, said electrode producing method comprising steps of:

providing said first bar with surface roughness of Ra≧0.9 μm by subjecting said first bar to sandblast processing; and securing said cathode part to said first bar after said sandblast processing.

19. An electrode producing method as defined in claim 18, further comprising a step of pressurizing and deforming said cathode part, to attach said cathode part to said first bar.

20. An electrode producing method as defined in claim 19, wherein said first bar has a first end portion disposed on a farther side from said cathode part;

said pin-shaped electrode further includes a second bar of metal having a second end portion connected with said first end portion;

further comprising a step of connecting said second bar with said first bar before said sandblast processing.

21. An electrode producing method as defined in claim 18, wherein the roughness has an Rmax≧10 μm.

22. An electrode producing method as defined in claim 12, wherein the recess is formed so that a center portion of the recess is deeper than other portions of the recess.

* * * * *